United States Patent
Schmidt

(10) Patent No.: US 12,103,438 B2
(45) Date of Patent: Oct. 1, 2024

(54) DEVICE FOR MOUNTING A SEAT OR A STANDING PLATE RELATIVE TO A FRAME OF A VEHICLE

(71) Applicant: E & CO HOLDING APS, Aarhus (DK)

(72) Inventor: Erik Schmidt, Skødstrup (DK)

(73) Assignee: E & CO HOLDING APS, Aarhus (DK)

( * ) Notice: Subject to any disclaimer, the term of this patent is extended or adjusted under 35 U.S.C. 154(b) by 628 days.

(21) Appl. No.: 17/423,011

(22) PCT Filed: Jan. 14, 2020

(86) PCT No.: PCT/DK2020/050019
§ 371 (c)(1),
(2) Date: Jul. 14, 2021

(87) PCT Pub. No.: WO2020/147910
PCT Pub. Date: Jul. 23, 2020

(65) Prior Publication Data
US 2022/0097573 A1 Mar. 31, 2022

(30) Foreign Application Priority Data

Jan. 15, 2019 (DK) .......................... PA 2019 70029
Feb. 12, 2019 (DK) .......................... PA 2019 70098
Sep. 25, 2019 (DK) .......................... PA 2019 70590

(51) Int. Cl.
*B60N 2/14* (2006.01)
*B60N 2/005* (2006.01)
(Continued)

(52) U.S. Cl.
CPC .............. *B60N 2/14* (2013.01); *B60N 2/005* (2013.01); *B62D 51/02* (2013.01); *B66F 9/0759* (2013.01);
(Continued)

(58) Field of Classification Search
CPC ................ B60N 2/14; B60N 2002/247; B60N 2205/20; B60N 2/005; B60N 2002/0212; B62D 51/02
(Continued)

(56) References Cited

U.S. PATENT DOCUMENTS 3,466,089 A 9/1969 Stueckle
3,632,076 A * 1/1972 Rogers, Jr. ............... B60N 2/39
248/371

(Continued)

FOREIGN PATENT DOCUMENTS

EP        1172285 A2 *  1/2002 ............... B62B 3/06
WO    WO 2018/138776   8/2018

OTHER PUBLICATIONS

PCT International Search Report issued in International Application No. PCT/DK2020/050019, dated Jul. 7, 2020.

*Primary Examiner* — Joseph D. Pape
(74) *Attorney, Agent, or Firm* — Parker Highlander PLLC

(57) ABSTRACT

The invention relates to a device (1) for mounting a seat (2) or a standing plate (25) relative to a frame (3) of a vehicle. The device comprises a seat holder (4) or a standing plate holder (4a) having at least one flange (7) extending laterally from the seat holder or the standing plate holder. The seat holder or the standing plate holder is pivotally mounted to the frame so that the frame and the seat holder or the standing plate holder can move relative to each other. The device has at least one first vibration damper (8) and/N or at least one stop (10) limiting the possible movement of the at least one flange thereby providing free movement until limits for the pivotal movement are met; these limits are adjustable. The device may also be provided with other kinds of vibration dampers (15, 18) designed and arranged to counteract that vibrations and movements of the frame during driving are transferred to the driver. Hereby a less (Continued)

damaging and more pleasant driving is obtained. The invention also relates to a vehicle with such a device.

19 Claims, 12 Drawing Sheets

(51) Int. Cl.
  *B62D 51/02* (2006.01)
  *B66F 9/075* (2006.01)
  *B60N 2/02* (2006.01)
  *B60N 2/24* (2006.01)
(52) U.S. Cl.
  CPC .............. *B60N 2002/0212* (2013.01); *B60N 2002/247* (2013.01); *B60N 2205/20* (2013.01)
(58) Field of Classification Search
  USPC .............. 296/65.01, 65.05; 297/314, 344.11
  See application file for complete search history.

(56) References Cited

U.S. PATENT DOCUMENTS

| | | | | |
|---|---|---|---|---|
| 3,774,711 | A | * | 11/1973 | Lacey .................... B60N 2/544 |
| | | | | 267/131 |
| 5,579,859 | A | * | 12/1996 | Quellhorst ......... B62D 33/0604 |
| | | | | 248/638 |
| 2018/0022238 | A1 | | 1/2018 | Gonzalez Uribe et al. |

* cited by examiner (a)

(b)

(a) (b)

(c) (d)

DEVICE FOR MOUNTING A SEAT OR A STANDING PLATE RELATIVE TO A FRAME OF A VEHICLE

This application is a national phase application under 35 U.S.C. § 371 of International Application No. PCT/DK2020/050019, filed Jan. 14, 2020, which claims priority to Denmark Application Nos. PA 2019 70029 filed Jan. 15, 2019, PA 2019 70098 filed February 12, 2019, and PA 2019 70590 filed Sep. 25, 2019. The entire contents of each of the above referenced disclosures is specifically incorporated herein by reference.

FIELD OF THE INVENTION

The present invention relates to a device for mounting a seat relative to a frame of a vehicle. The invention also relates to a device which is intended for use by the driver standing on a plate mounted to the frame of the vehicle. In particular, it relates to such devices with which a driver of the vehicle is exposed to significantly less impact forces and vibrations, e.g. relating to the vehicle driving along an uneven surface, than what is the case for a known vehicle of the same type.

BACKGROUND OF THE INVENTION

Within many different technical fields, vehicles are steered by a person seated on a seat that is mounted firmly to the frame of the vehicle in a manner which means that impact forces, change of direction, and vibrations caused by the vehicle driving along an uneven surface or bumping into obstacles are transferred from the frame to the seat and thus also to the driver. Similar effects are experienced in relation to vehicles driven by a person standing on a plate mounted to the frame of the vehicle. Such influences experienced during driving may not just be uncomfortable but may also, over short or long term, be damaging to the driver's body either due to one single high load or due to repeated exposure to smaller loads over a longer period. Furthermore, a sudden impact may give the driver a fright and thereby influence the driving safety negatively. For some kinds of vehicles, such as cars, this is partly counteracted by building various kinds of protection, including vibration dampers and padding, into the vehicle. However, even with such known types of protection, it cannot be avoided that repetitive vibrations and hard impact are transferred to the driver of a vehicle.

For some kinds of vehicles, it is not possible to avoid the abovementioned negative effects of the driving due to the construction of the vehicle or in order to keep the cost of the vehicle at a reasonably low level. There may e.g. be limits on the acceptable physical size or weight of the vehicle. Even for vehicles which are provided with some vibration dampers, e.g. in the form of helical springs, it is well known that they can normally only provide some extent of damping. Furthermore, such damping is typically only designed to counteract the most expected kinds of loading, such as smaller bumps, but not sudden unintended impacts, such as if the vehicle is driven over a kerb or into an obstacle, such as a wall or an overlooked object. These limits on the design are also related to the fact that many industrial vehicles are optimised with respect to the transportation function to be fulfilled and not so much with focus on protecting the driver.

Hence, an improved device for mounting a seat or a standing plate relative to a frame of a vehicle would be advantageous.

OBJECT OF THE INVENTION

It is an object of the present invention to provide a device for mounting a seat or a standing plate relative to a frame of a vehicle which device is more efficient in providing damping of the transfer of forces and vibrations from the frame to the seat or to the standing plate and thereby to the driver than what is known from prior art vehicles of the same type.

It is another object of the present invention to provide a device for mounting a seat or a standing plate relative to a frame of a vehicle which device has a higher safety against single impact loading, such as from the vehicle hitting an obstacle, being transferred to the driver of the vehicle.

It is a further object of the present invention to provide an alternative to the prior art.

In particular, it may be seen as an object of the present invention to provide a device for mounting a seat or a standing plate relative to a frame of a vehicle which device solves the above mentioned problems of the prior art.

SUMMARY OF THE INVENTION

The above described object and several other objects are intended to be obtained in a first aspect of the invention by providing a device for mounting a seat relative to a frame of a vehicle, the device comprising a seat holder, and the seat holder having an outer surface,
wherein:
the seat holder is provided with at least one flange extending laterally from the seat holder,
the seat holder is pivotally mounted to the frame so that the frame and the seat holder can move relative to each other laterally in at least one plane, when the device is in use mounted on the vehicle,
at least one first vibration damper and/or at least one stop being arranged to limit the possible movement of the at least one flange thereby providing free movement until limits for the pivotal movement of the frame relative to the seat holder are met, and
the positions of the at least one first vibration damper and/or the at least one stop relative to the at least one flange are adjustable so that the limits for the possible movement of the at least one flange and thereby the possible movement of the frame relative to the seat holder are adjustable.

By "frame" is meant a body part of the vehicle to which other components of the vehicle are also fastened. In particular, the frame will move, such as vibrate, when the vehicle is driven across an uneven surface. The frame could also be referred to as the chassis of the vehicle.

The shape of the cross-section of the seat holder may be circular, but the shape may also be e.g. elliptic or square.

The seat holder can be mounted to the frame at a lower end, and this will be the case in the embodiments shown in the figures. However, the mounting could also be somewhere along the length of the seat holder.

The scope of protection also covers embodiments wherein the device is intended for use by the driver standing on a plate mounted to the frame of the vehicle. Examples of such embodiments will be shown in some of the figures. Such a plate has an upper surface which would form a seat for a person choosing to sit down thereon, and the working principle and the obtained dampening would correspond to that of a seat as described in the other examples.

Thus, as an alternative to the above-mentioned embodiments, a first aspect of the invention may alternatively be obtained by providing a device for mounting a standing plate relative to a frame of a vehicle, the device comprising the standing plate and a standing plate holder adapted to carry the standing plate, and the standing plate holder having an engagement surface, wherein:

the standing plate holder is provided with at least one flange extending laterally from the standing plate holder, the standing plate holder is pivotally mounted to the frame so that the frame and the standing plate holder can move relative to each other laterally in at least one plane, when the device is in use mounted on the vehicle, at least one first vibration damper and/or at least one stop being arranged to limit the possible movement of the at least one flange thereby providing free movement until limits for the pivotal movement of the frame relative to the standing plate holder are met, and the positions of the at least one first vibration damper and/or the at least one stop relative to the at least one flange are adjustable so that the limits for the possible movement of the at least one flange and thereby the possible movement of the frame relative to the standing plate holder are adjustable.

As mentioned above, the seat holder or the standing plate is able to move freely relative to the frame within adjustable limits. By "freely" and "free" movement is meant that the only forces acting against such movement are the small frictional forces of the pivotal mounting. Small vibrations occurring during driving along an uneven surface typically have force components in more directions and planes. An advantage of the free movement obtained with the present invention is that possible transfer of these small vibrations from the frame to the driver during driving are minimized compared to known systems.

The pivotal mounting is preferably obtained via a bearing, such as a roller bearing, to ensure that the movement is as free from resistance as possible. The effect of such an arrangement is that when the vehicle is driven along an uneven ground surface, such as a floor or a field, or bumping into obstacles in the surroundings, such as a kerb or wall, the frame follows these variations without the related movements being transferred to the seat or to the standing plate. This means that a driver of the vehicle will not be exposed to the vibrations and impact forces that would occur in case of the vehicle comprising a traditional fixedly mounted seat or standing plate. Hereby the driver will remain in a stable and substantially non-moving state despite the uneven surface so that the driver will experience the driving as if it was along a smooth surface.

In embodiments of the invention in which the relative movement between the frame and the seat holder or standing plate are in one plane only, this relative movement should preferably be laterally, i.e. sideways, with respect to a driving direction of the vehicle. The reason is that in this direction the possible vibrations are the most critical for the driver because the structure of the back of a human body is designed to meet impact especially in the forward-backward orientation. With impact and movement in this direction, the body has many joint structures onto which the impact can be distributed so that the forces are not critical; an example is the combined load carrying capability of the hips, pelvis and back. Therefore, movement in this direction can take place in a smooth and flexible way. This is not the case in the lateral direction. Furthermore, the vertebra is designed for lateral stability and movement forwards and backwards as that is the most typical way of moving the body. Therefore, lateral impact when driving on an uneven surface with a traditional vehicle, is transferred upwards through the driver's back that is not laterally flexible, and this results in disadvantageous influences to the body. With the present invention, such undesired impact can be avoided resulting in less risk of damage to the body of the driver as well as a more pleasant driving experience.

Vibration dampers for use in the present invention may e.g. be dumpers made from a resilient material. Such dumpers are known from other applications, such as for damping the propagation of vibrations from a machine or a fridge to the surroundings. The vibration dampers may alternatively or in combinations therewith be springs, such as helical springs, or vibration dampers made from other kinds of materials suitable for providing the damping effect. Vibration dampers on their own and the general use thereof are known to the person skilled in the art.

In some embodiments of the invention, a given damper provides both the damping of the relative movement and a stop establishing a physical limit for the movement. In this case, the stop is established by the damper not being further compressible by the actual acting forces. In other embodiments, a damper and a stop may be provided as separate components so that a movement is first dampened by the vibration damper and then completely limited if the flange reaches the stop. The dampers may act in compression only; this will e.g. be the case for a block of resilient material having a free surface facing towards the flange with which it is to engage. The dampers may also act both in compression and tension so that one damper can work in more directions. This can e.g. be obtained by use of a spring fastened in both ends thereof.

The possibility of adjusting the position of the at least one first vibration damper and/or the at least one stop relative to the at least one flange may include one or more possible kinds of adjustment. It may e.g. be possible to change a mounting position between a plurality of possible mounting holes arranged at different distances from a central axis of the seat holder. It may also be possible to vary the possible pivotal movement by varying a distance between the flange and the respective first vibration damper or stop. This can e.g. be done by mounting the component to be adjusted with threaded rods as will be shown in the figures. The device may also be provided with automatic or semi-automatic adjustment possibilities so that the limits can be adjusted during driving, e.g. when driving onto a more uneven surface. Such adjustment systems can be based on the adjustable components being mounted and adjusted via actuators, such as pneumatic, hydraulic or electric actuators.

In presently preferred embodiments of the invention, the positions of all the present vibration dampers and stops are individually adjustable so that different relative movement patterns are possible; this will be explained in relation to the figures. It may e.g. be relevant for a given application to allow for a larger freedom of movement parallel to a driving direction than perpendicular thereto.

In some embodiments of the invention, the seat holder or the standing plate holder is pivotally mounted in two separate hinges having non-parallel axes of rotation. Hereby it is obtained that the seat holder or the standing plate holder is rotatable 360 degrees around a central axis thereof, so that the transfer of impact forces and vibrations to a driver sitting on the seat or standing on the standing plate can be eliminated in all directions. An example is embodiments wherein the seat holder or the standing plate holder may e.g. be mounted to the frame via a cardan joint so that the seat holder or the standing plate holder is rotatable 360 degrees around a central point of the cardan joint. A cardan joint is also referred to as a universal joint. In embodiments having the two axes offset relative to the longitudinal axis of the seat holder or standing plate holder, a more compact device is obtained than what is possible with a cardan joint having the same possible movements.

In presently preferred embodiments of the invention, the pivotal mounting of the seat holder or the standing plate holder in relation to the frame is the only mounting thereof. However, it will also be possible to add minor further support which could then be considered as part of the mounting. By "minor" is meant that the pivotal mounting takes up a majority of the forces that would otherwise influence the driver.

In some embodiments of the invention when used for mounting a seat, the seat holder comprises a seat rod adapted to carry the seat, and a tubular shaft having a circumferential wall, the tubular shaft having the seat rod retained within the circumferential wall.

Typically, the shape of the hollow space surrounded by the circumferential wall should match the shape of the seat rod to facilitate a secure retaining thereof while still allowing for adjustment of the seat height, if relevant.

In such embodiments with the seat holder comprising a tubular shaft retaining a seat rod adapted to carry the seat, the at least one flange preferably extends laterally outwards from the outer surface of a circumferential wall of the tubular shaft. For typical sizes of seat holders, this is where it is most convenient to arrange the flange and the dampers and stops. However, the scope of the invention also covers embodiments having corresponding arrangements within the circumferential wall if there is enough room. Examples of possible designs will be shown in the figures.

In some embodiments of the invention with the seat holder comprising a tubular shaft retaining a seat rod adapted to carry the seat, an inner surface of the circumferential wall of the tubular shaft is provided with at least one set, such as row, of circumferentially arranged second vibration dampers, the second vibration dampers extending to the seat rod so that the seat rod is supported by the second vibration dampers.

In such embodiments of the invention, the inner surface may be provided with at least two sets of circumferentially arranged second vibration dampers which sets are spaced apart along the tubular shaft.

The numbers of sets and the mutual arrangements thereof may e.g. depend on the dimensions and the expected forces to be experienced during of the vehicle. In the presently preferred embodiments of the invention, a set of second vibration dampers is a plurality of such dampers arranged in a row; this is what will be shown in the figures. The second vibration dampers in one row may be circumferentially offset from the second vibration in another row to provide a more stable support and damping for all directions of the forces to be dampened. Other designs of the second vibrations dampers are also covered by the scope of the invention. An example is second vibration dampers made in the form of annular rings.

In some embodiments of the invention when used for mounting of a standing plate, the standing plate is provided with a downwardly facing annular ring or a plurality of downwardly facing circumferentially arranged tabs, and an inner surface of the annular ring or inner surfaces of the tabs is/are provided with at least one set, such as row, of circumferentially arranged second vibration dampers, the second vibration dampers extending to the standing plate holder so that the standing plate is supported by the second vibration dampers. By "circumferentially arranged tabs" is meant that the tabs are arranged around a central region of the standing plate. They may be arranged near a circumference of the standing plate, but they may also be arranged at a distance therefrom. Furthermore, they may be arranged at different distances from the circumference of the standing plate, such as at different distances from a central region of the standing plate.

Each of the at least one first vibration damper may be made from of a resilient material and may be in the form of a tapered block with rounded tip, the rounded tip facing towards the at least one flange. In embodiments having second vibration dampers, the second vibration dampers may be made from of a resilient material and may be in the form of tapered blocks with rounded tips, the rounded tips facing towards the seat rod or towards the standing plate holder. Such first and second vibration dampers may e.g. made from rubber-based material. A possible adjustment of a vibration damper will be to change between a plurality of available vibration dampers having different damping characteristics, such as being made from different materials.

The effect of such second vibration dampers in the form of tapered blocks of resilient material and arranged as explained above is that they provide the dampening in all directions, including upwards and downwards and in rotation. This is particularly advantageous for embodiments of the invention in which a seat is offset from the longitudinal axis of the seat rod so that the torque due to the weight of the driver influences the force distribution caused by impact and movement during driving.

The first and/or second vibration dampers may be provided with threading, such as being a threaded rod, and the position of those vibration dampers may be adjustable by screwing the threading relative to a threaded counterpart, such as a nut.

In some embodiments of the invention comprising a seat rod, a lower end of the seat rod is arranged on a third vibration damper adapted to dampen the movements of the seat rod when in use on a moving vehicle. A possible design will be shown in relation to the figures. Such a third vibration damper dampens the vertical movement, e.g. due to the vehicle driving over a bump. However, it also dampens the vibrations in other directions.

In any of the above-described embodiments, the seat holder or standing plate holder and a drive unit of the vehicle may be mounted on a slewing ring which is arranged and mounted so that it can rotate with respect to the frame. Such a rotational movement may e.g. be obtained by having a plurality of bearings or balls or a low-friction material arranged between the base plate and an annular slewing ring, which slewing ring is typically circumferentially arranged around a lower end of the drive unit. The rotational movement of the drive unit and the seat holder or standing plate holder relative to the frame may alternatively be obtained by arranging the drive unit and the seat holder or standing plate holder on a plate which is rotationally mounted on the frame.

By having such a rotational mounting, it is obtained that the driving direction of the vehicle can be changed to match a desired manner of driving the vehicle. Such a change of direction by rotating the slewing ring, and thereby the seat holder or the standing plate and the drive unit, may be manual or it may be driven e.g. by a motor or hydraulic system. The relative rotational movement should preferably be locked during driving.

In any of the embodiments as described above, the device may be provided with sensors, such as strain gauges, via which the forces acting on some or all of the vibration dampers during driving can be registered by use of a monitoring system. Such sensors may be built into the dampers, or they may be arranged so close thereto that representative signals are obtained. Hereby details of the damping characteristics and loading patterns can be analysed and used to adjust and optimize the individual positions of the vibration dampers according to a given driving condition.

In a second aspect, the invention relates to a vehicle, such as a three-wheeled vehicle, comprising a device as described above and, for embodiments comprising a seat holder, a seat mounted to the vehicle by use of the device. The vehicle is typically a motor-driven vehicle, but the scope of the invention also covers other kinds of vehicles, such as e.g. a pedal driven vehicle. A three-wheeled vehicle is particularly useful for driving around sharp corners. Such a kind of vehicle is e.g. used for moving beds in a hospital. A vehicle may have the seat or the standing plate mounted by use of more than one device as described above.

The first and second aspect of the present invention may each be combined. These and other aspects of the invention will be apparent from and elucidated with reference to the embodiments described hereinafter.

BRIEF DESCRIPTION OF THE FIGURES

The device for mounting a seat or a standing plate relative to a frame of a vehicle according to the invention will now be described in more detail with regard to the accompanying figures. The figures show one way of implementing the present invention and is not to be construed as being limiting to other possible embodiments falling within the scope of the attached claim set.

FIG. 1.a is a side view, and FIG. 1.b is a rear view.

DETAILED DESCRIPTION OF AN EMBODIMENT

Figure 1:
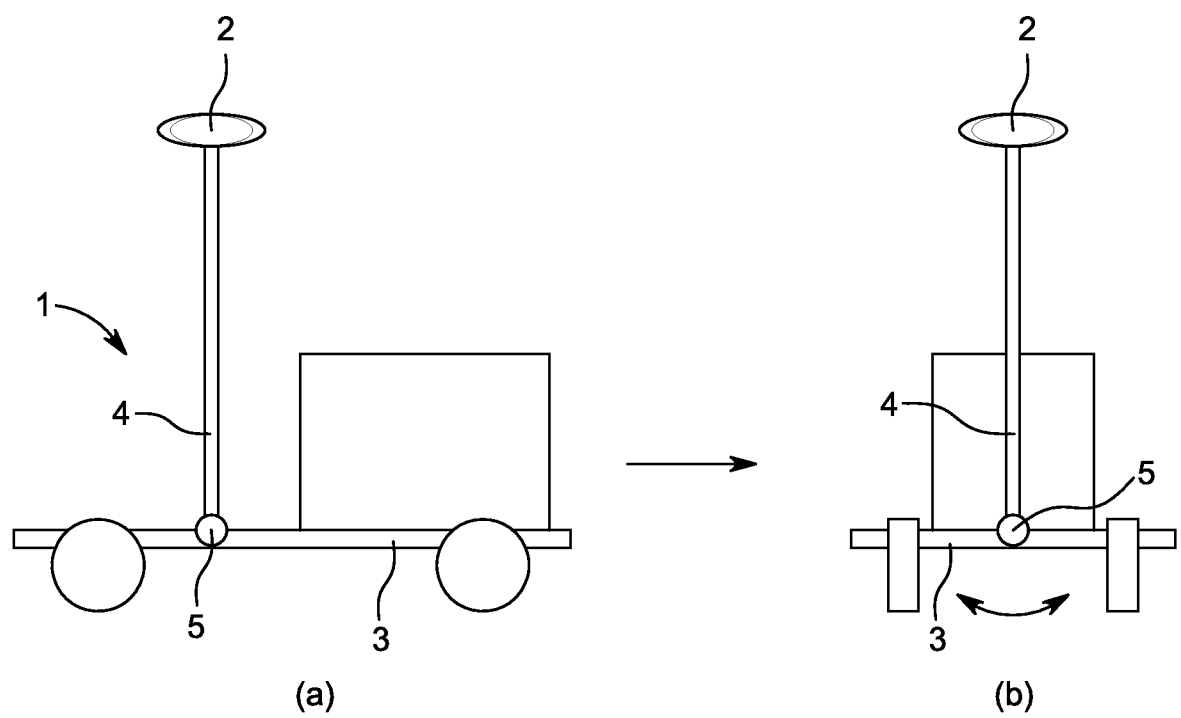
FIG. 1 shows schematically the overall concept of a vehicle comprising a device according to the present invention.

In some embodiments, the invention relates to a device 1 for mounting a seat 2 relative to a frame 3 of a vehicle in a manner which protects the driver of the vehicle against impact resulting from e.g. driving along an uneven surface. Such impact can both be unpleasant and cause damage to the driver's body as explained above. The overall concept of a vehicle comprising such a device 1 is shown schematically in FIG. 1. The driver is not shown in the figures, but he will be sitting on the seat 2 while driving the vehicle. The device 1 has a seat holder 4 which carries the seat 2 on which the driver may be fully sitting so that his whole weight is carried by the seat and thereby by the seat holder 4. He may also be half standing so that only a part of his weight is carried by the seat holder 4. In all the figures, the seat holder 4 is shown as being vertically arranged. However, it may also be arranged at an inclined angle, if desired. Such an inclined seat holder may e.g. provide the same effect as having the seat arranged offset from a longitudinal axis of a vertical seat holder. In FIG. 1, other parts of the vehicle that are not relevant for the description of the invention are marked as a box.

The seat holder 4 is pivotally mounted to the frame 3 so that the frame 3 and the seat holder 4 can move relative to each other laterally in at least one plane, when the device 1 is in use mounted on the vehicle. In this figure, the pivotal mounting 5 is schematically shown as a circle. FIG. 1.a is a side view with the arrow indicating a possible driving direction of the vehicle; the driving direction may also be the opposite of the illustrated one. FIG. 1.b is a rear view with the curved arrow indicating the possible lateral mutual movement of the frame 3 and the seat holder 4 e.g. in response to driving on an inclined surface or due to the forces and vibrations experienced during driving. As explained in more details above, vibrations and impact in the lateral direction, i.e. sideways with respect to the facing direction of the driver, are the most critical for the driver because the structure of the human body. With the present invention, such undesired impact can be avoided resulting in less risk of damage to the body of the driver as well as a more pleasant driving experience.

Figure 2:
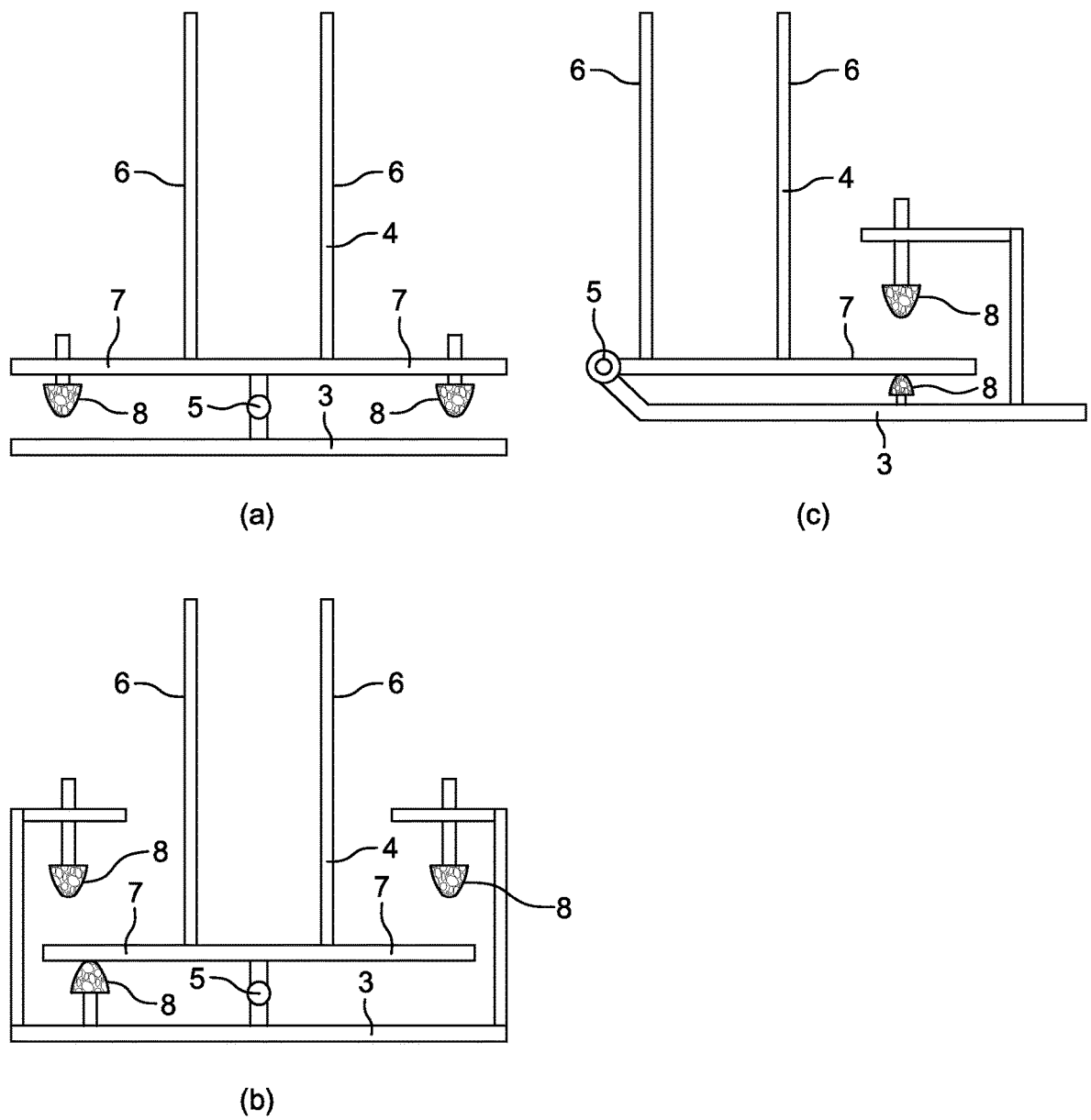
FIG. 2 shows schematically different arrangements of the first vibration dampers in relation to the at least one flange and the seat holder.

FIG. 2 shows different embodiments of the invention when used for mounting a seat. The illustrated embodiments are not intended to show an exhaustive list of possible designs. In the illustrated embodiments, the pivotal mounting 5 of the seat holder 4 in relation to the frame 3 is the only mounting thereof. The seat holder 4 has an outer surface 6 and is provided with at least one flange 7 extending laterally from the outer surface 6 of the seat holder 4. Different numbers of flanges 7 will be shown in the following figures in order to illustrate some possible designs which are covered by the scope of the invention.

FIG. 2 shows different embodiments in which the device 1 is provided with first vibration dampers 8 that are arranged to limit the possible movement of the at least one flange 7 thereby providing free movement until limits for the pivotal movement of the frame 3 relative to the seat holder 4 are met. In these embodiments, the first vibration dampers 8 therefore include stops, since when the resilient material from which they are made cannot be further compressed by the actual forces, the movement is also stopped.

In FIG. 2, the driving direction is preferably perpendicular or substantially perpendicular to the plane of the paper. Some parts of the vehicle, such as the wheels and the seat are not shown in this figure. The seat holder 4 is shown schematically as a hollow shaft. The seat may be arranged on a seat rod to be retained within this shaft, or the seat may be fastened directly to an upper end of the hollow shaft; this will be shown below. In the embodiments in FIGS. 2.*a* and 2.*b*, the pivotal joint 5 is arranged below the central axis of the seat holder 4 whereas in FIG. 2.*c* it is offset therefrom.

FIG. 2.*a* shows an embodiment with two flanges 7 extending in opposite directions and each having a first vibration damper 8 fastened thereto. This means that the frame 3 can move relatively to the seat holder 4 until the frame 3 is first dampened and then stopped by one of the first vibration dampers 8. FIG. 2.*b* shows a similar design in which two first vibration dampers 8 are arranged at 30 one of the flanges 7 and one first vibration damper 8 is arranged at the other flange 7. In the embodiments in FIG. 2.*a* and 2.*b*, the two first vibration dampers 8 are shown to allow for the same movement of the flanges 7, but that does not need to be the case. In FIG. 2.*b*, three first vibration dampers 8 are shown just to illustrate different possible locations thereof. The illustrated embodiment would also work as intended with either the lower second vibration damper or the right second vibration omitted. FIG. 2.*c* shows an embodiment having one horizontally extending flange 7, wherein the movement of the flange 7 relative to the seat holder 4 is limited by first vibration dampers 8 arranged on different parts of the frame 3.

Figure 3:
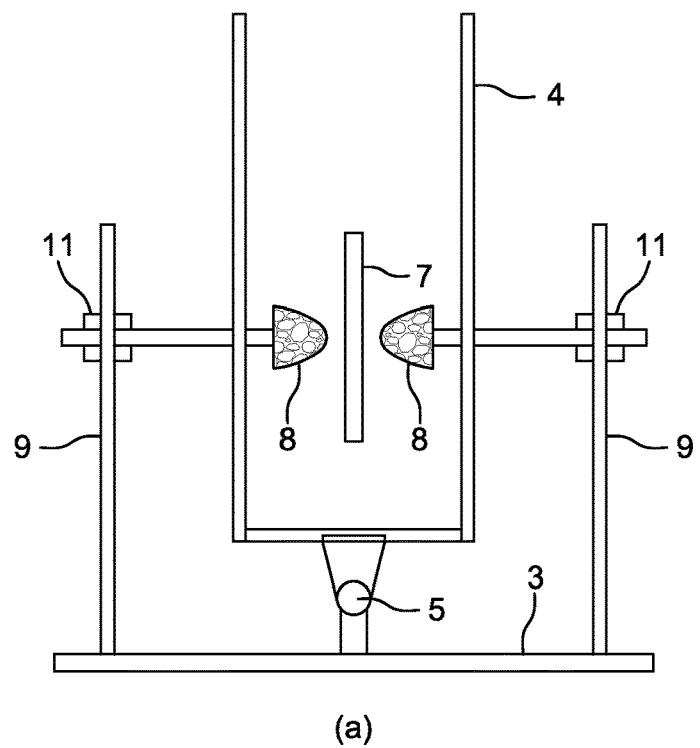
FIG. 3 shows schematically an embodiment having two vertically arranged flanges adapted to engage with the first vibration dampers arranged on the frame.
Figure 3:
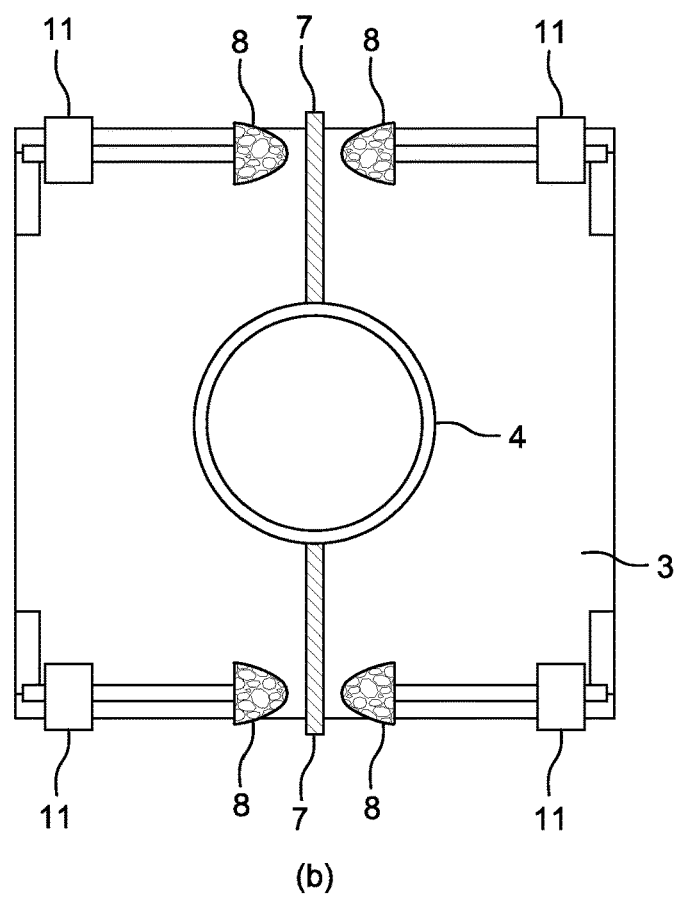

FIG. 3 shows an embodiment having two vertical flanges 7 extending from the outer surface 6 of the seat holder 4. FIG. 3.*a* is a side view so that only one of the flanges 7 is visible, and FIG. 3.*b* is a top view showing both flanges 7. In this embodiment, the first vibration dampers 8 are arranged on the frame 3 in the form of vertically extending frame parts 9 fixedly connected to a lower part of the frame 3.

Figure 4:
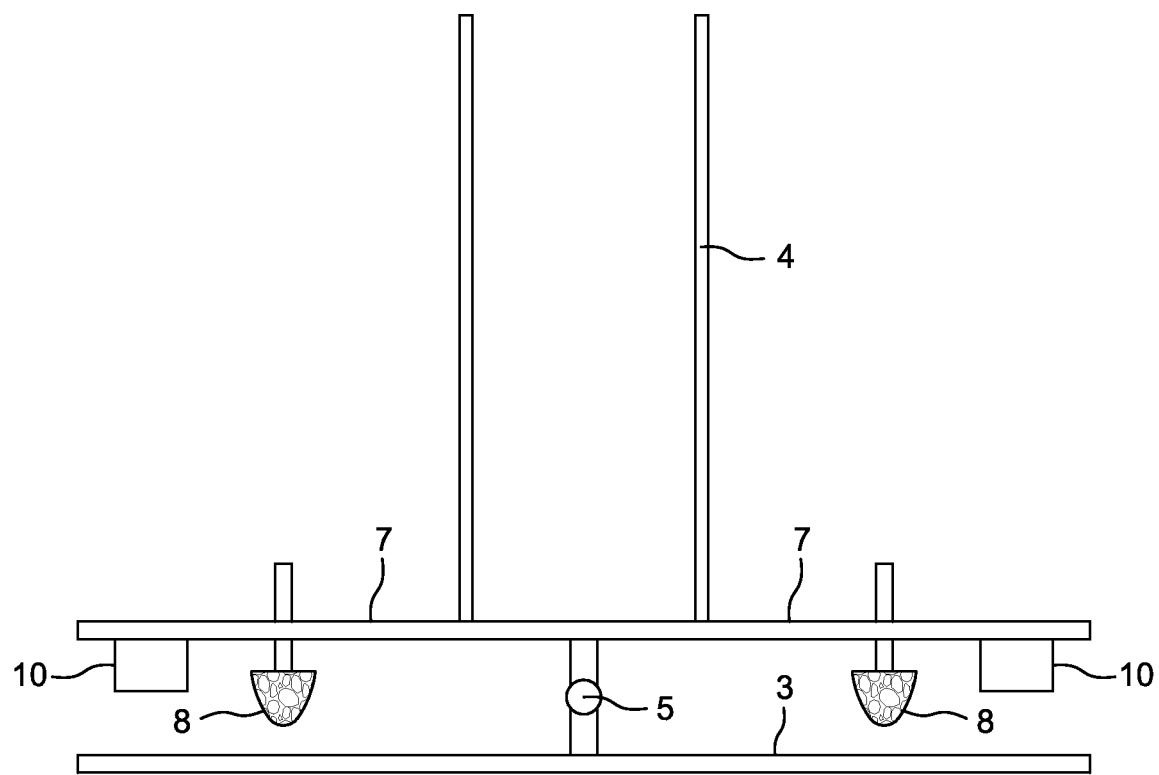
FIG. 4 shows schematically the embodiment in FIG. 2.a further provided with stops.

If desired, the device 1 may also be provided with stops 10 in addition to first vibration dampers 8. FIG. 4 shows schematically an example of a device 1 15 provided with both first vibration dampers 8 and stops 10. For ease of understanding, the design resembles the one in FIG. 2.*a*. In similar ways, the designs shown in FIGS. 2.*b*, 2.*c*, and 3 could also be provided with one or more stops. Such stops 10 establish the maximum limits for the possible movement and may thus be considered as safety measures used to ensure that these limits are not exceeded independent of the function, such as compressibility, of the first vibration dampers 8. Such limits may e.g. related to what would make the vehicle fall over, and they will typically be determined as part of a design process. In the embodiment shown in FIG. 4, the positions of the stops 10 are not adjustable. However, it would also be possible the provide the stops 10 with means for adjusting the position in the same manner as what has been shown for the first vibration dampers 8.

The positions of the first vibration dampers 8 and/or the stops relative to the at least one flange 7 are adjustable. Hereby it is obtained that the limits for the possible movement of the at least one flange 7 and thereby the possible movement of the frame 3 relative to the seat holder 4 are adjustable. This will typically be obtained by providing them with a threading which can interact with threaded counterparts, such as nuts 11, as shown in FIG. 3.

Figure 5:
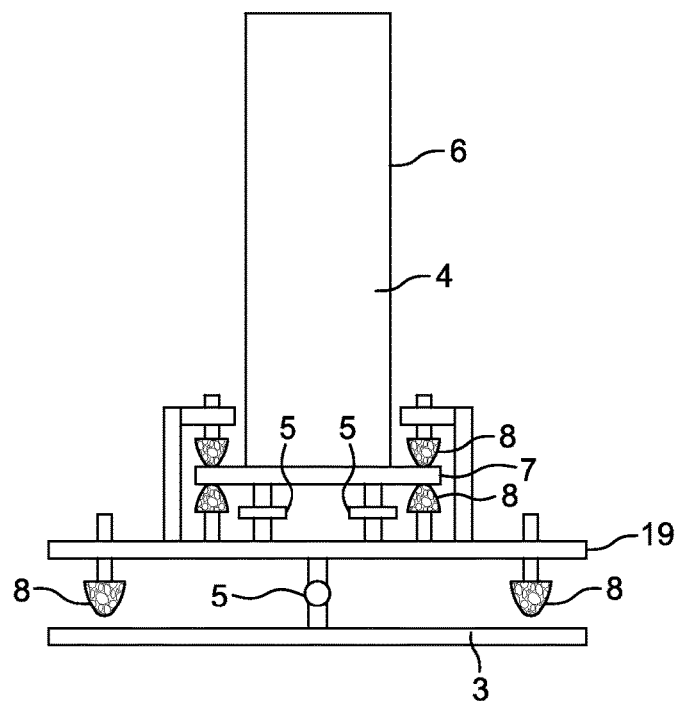
FIG. 5 shows schematically two embodiments of the invention in which the seat holder is pivotally mounted in two separate hinges having non-parallel axes of rotation.
Figure 5:
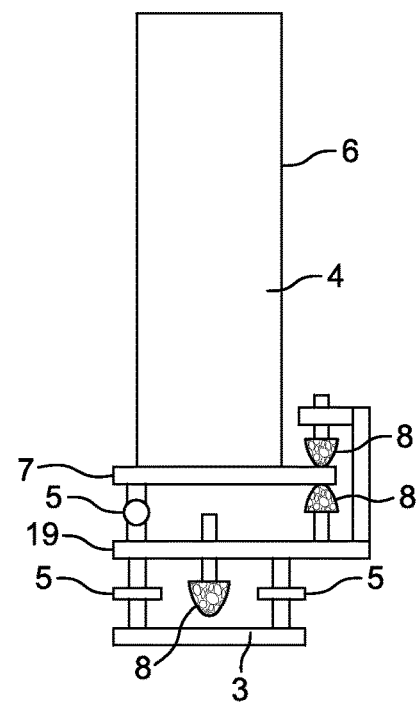
Figure 5:
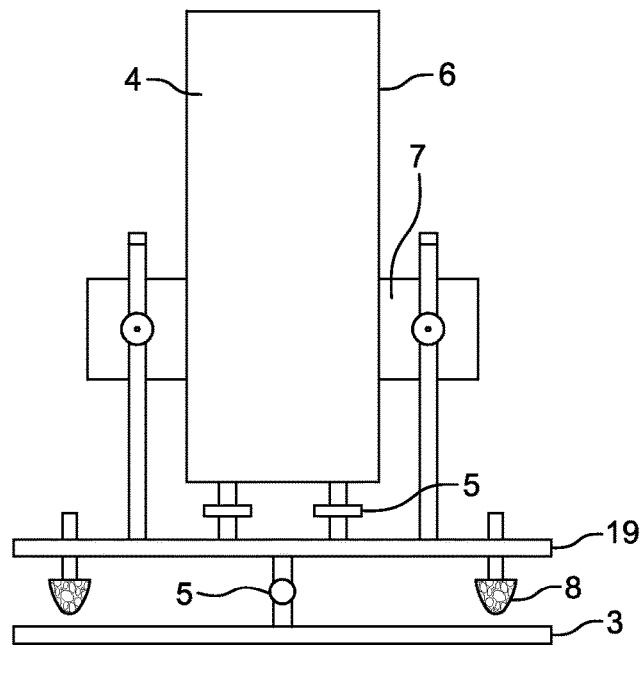
Figure 5:
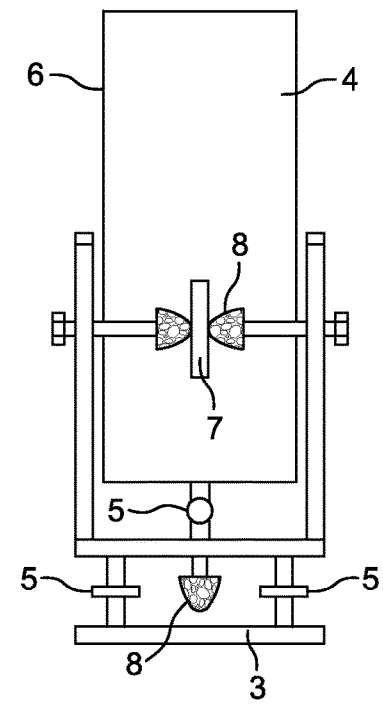

FIG. 5 shows schematically two other embodiment in which the seat holder 4 is pivotally mounted in two separate hinges 5 having non-parallel axes of rotation so that the seat holder 4 is rotatable 360 degrees. This means that the driver is protected against vibrations and impact in all directions and not just sideways with respect to the driving direction. FIGS. 5.*a* and 5.*b* show one embodiment from two perpendicular directions, and FIGS. 5.*c* and 5.*d* show another embodiment from two perpendicular orientations. In the illustrated embodiments, the two axes are arranged perpendicular to each other. One of these axes is arranged parallel to the driving direction so that it will allow for the lateral relative movement. In the illustrated embodiments, this axis is arranged in the same plane as the central axis of the seat holder 4. The other one of the illustrated axes is arranged offset relative to the longitudinal axis of the seat holder 4. Hereby a more compact device is obtained than what would be possible with a cardan joint having the same possible movements. As shown in FIG. 5, a device may also comprise additional parts 19 on which the various components are mounted.

Figure 6:
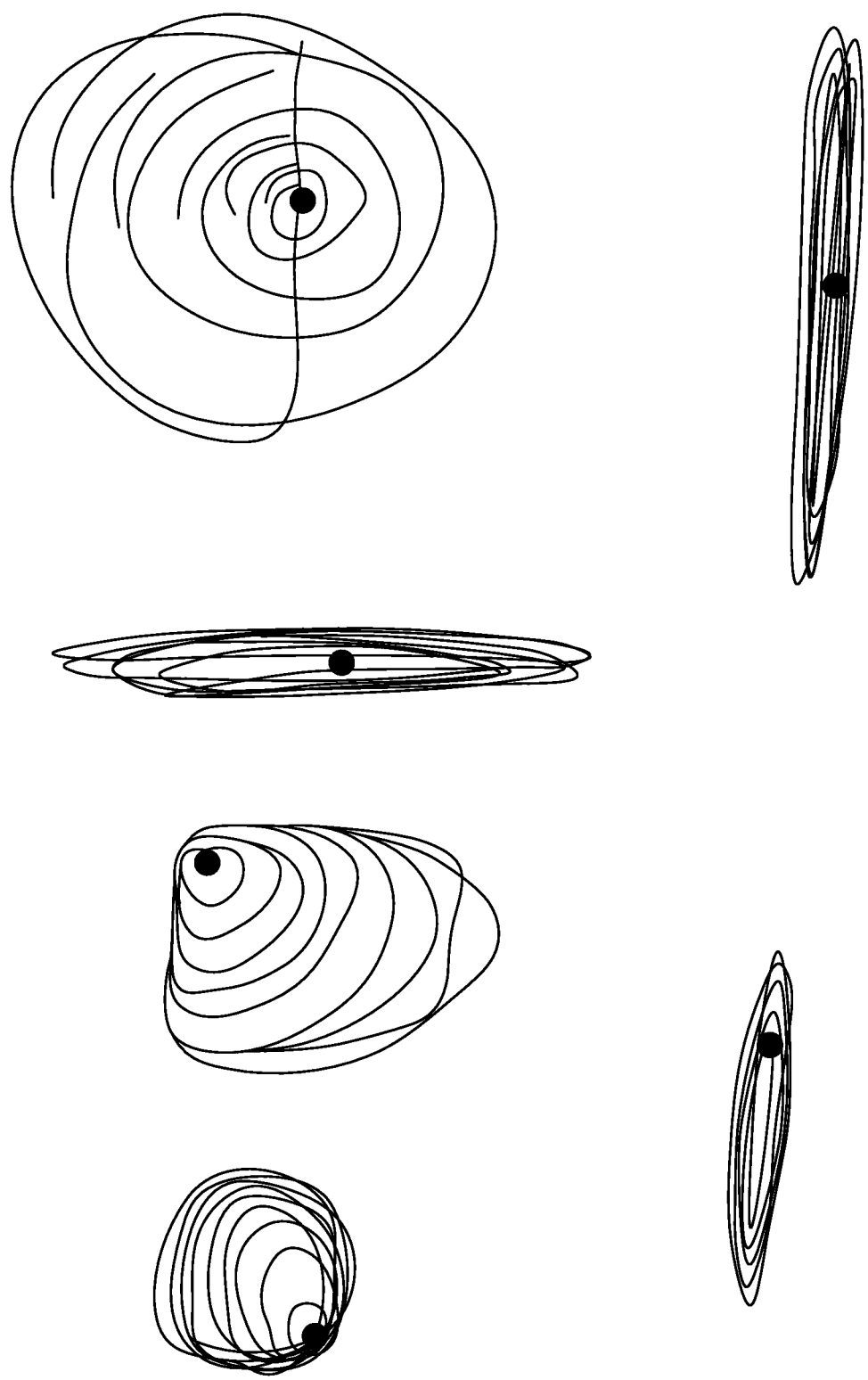
FIG. 6 shows schematically different possible movement patterns which can be obtained with the device in FIG. 5 provided that it has adjustable stops, possible formed by the first vibration dampers.

With embodiments having two separate pivotal mountings as e.g. shown in FIG. 5 and also having adjustably arranged first vibration dampers and/or stops, it is possible to obtain different possible degrees of freedom with respect to the movement with the same device. This is obtained by adjusting the positions and thereby the limits they provide. FIG. 6 shows schematically and in top view how various movement patterns can be obtained in relation to a given central point, such as a central axis of the seat holder 4. The central point is shown schematically as a dot in FIG. 6.

Figure 7A:
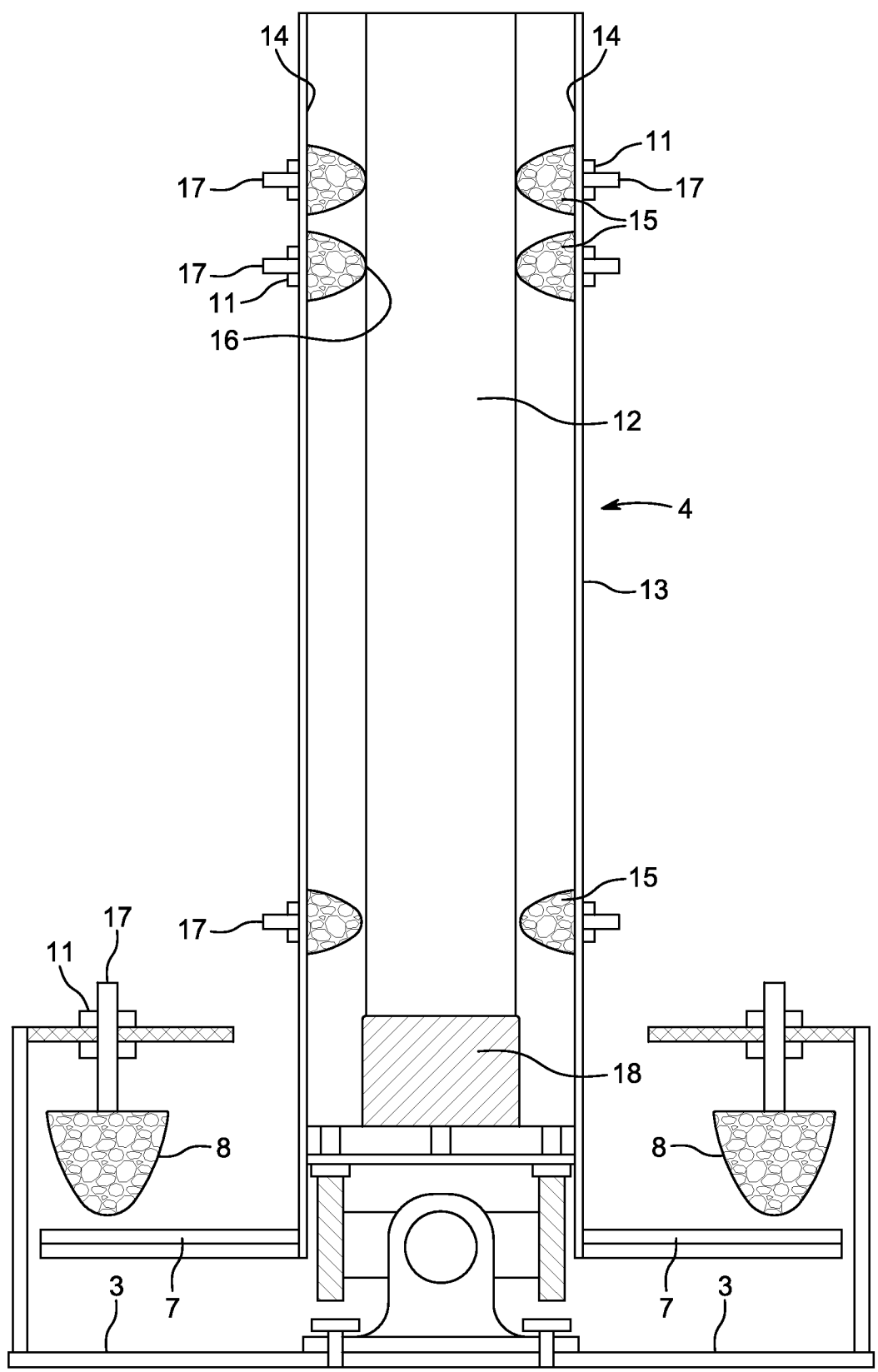
FIG. 7 shows schematically an embodiment of the invention comprising first, second, and third vibration dampers.
Figure 7B:
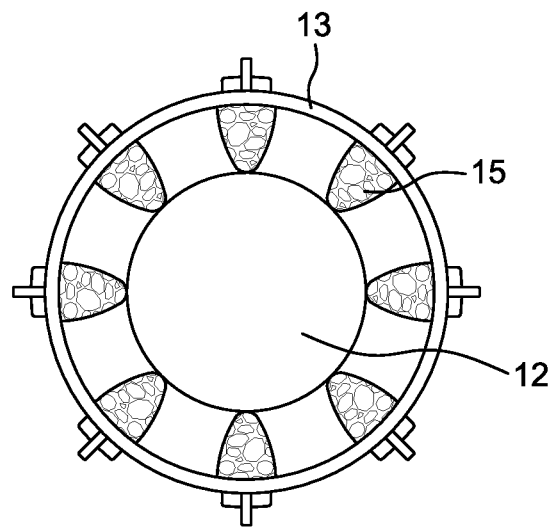

FIG. 7 shows schematically an embodiment of the invention in which the seat holder 4 comprises a seat rod 12, which carries the seat, and a tubular shaft 13 having a circumferential wall. The tubular shaft 13 has the seat rod 12 retained within the circumferential wall. The shape of the hollow space surrounded by the circumferential wall should match the shape of the seat rod 12 to facilitate a secure retaining thereof while still allowing for adjustment of the seat height, if relevant. In the embodiment shown in FIG. 7, an inner surface 14 of the circumferential wall of the tubular shaft 13 is provided with three rows of circumferentially arranged second vibration dampers 15 which are spaced apart along the tubular shaft 13 as shown in FIG. 7.*a*. The second vibration dampers 15 extend to the seat rod 12 so that the seat rod 12 is supported by the second vibration dampers 15. FIG. 7.*b* is a cross-sectional view of a section through a row of second vibration dampers 15 in FIG. 7.*a*.

The design of vibration dampers which is shown in FIG. 7 can be used both for the first vibration dampers 8 and for the second vibration dampers 15. Such a vibration damper is made from of a resilient material and is in the form of a tapered block with rounded tip 16. The vibration damper 8,15 is to be arranged so that the rounded tip face 16 towards the component with which it is to engage, i.e. the at least one flange 7 or the seat rod 12, respectively. As also explained above, the vibration dampers 8,15 in FIG. 7 are each provided with a threaded rod 17 so that the position of the vibration damper 8,15 is adjustable by screwing the threading relative to a threaded counterpart, such as a nut 11.

Figure 8:
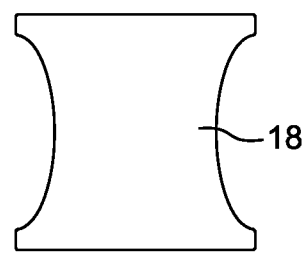
FIG. 8 shows schematically a possible design of a third vibration damper.

In FIG. 7, the lower end of the seat rod 12 is arranged on a third vibration damper 18 adapted to dampen the transfer of movements and vibrations from the frame 3 to the seat rod 12 when in use on a moving vehicle. In this embodiment, the third vibration damper 18 is in the form of a resilient material having straight edges. However, studies made in relation to the present invention has shown that the use of a third vibration damper 18 having a shape as shown schematically in FIG. 8 provides a more efficient total damping of the vibrations and movements when used in combination with second vibration dampers as explained in relation to FIG. 7. Such a shape as shown in FIG. 8 of the third vibration damper 18 gives it a lateral flexibility in all lateral directions which provides enough freedom to the second vibration dampers 15 to deform to such an extent that they apply the optimal dampening by deforming in different directions.

When a device according to the invention is designed to match a given application, a number of parameters can be varied. They include the size, number, damping characteristics and positions of the vibration dampers; the size, number, and positions of possible stops; the arrangement of the one or more flanges; and the number of devices used for a seat or for a standing plate. A device will typically be designed so that several of these parameters can be fine-tuned e.g. to match a given driver. Both the initial design and the fine-tuning can be based e.g. on a combination of experiments and computer simulations.

Figure 9A:
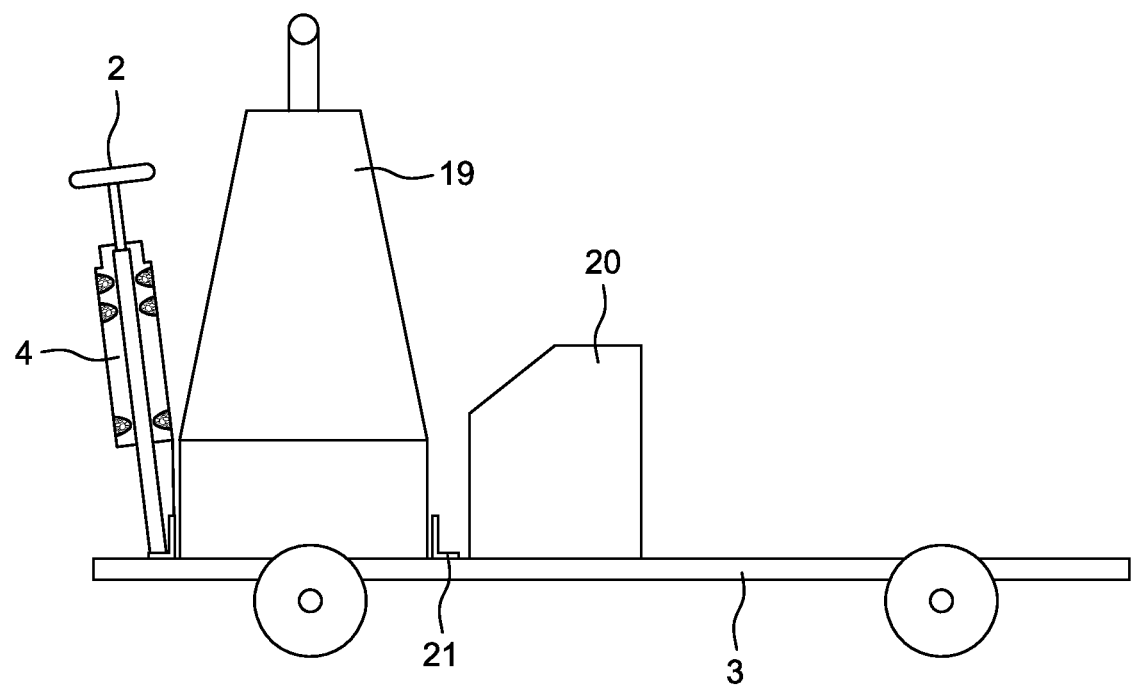
FIG. 9 shows schematically an embodiment of the invention in which the seat holder and the drive unit of the vehicle are mounted on a slewing ring.
Figure 9B:
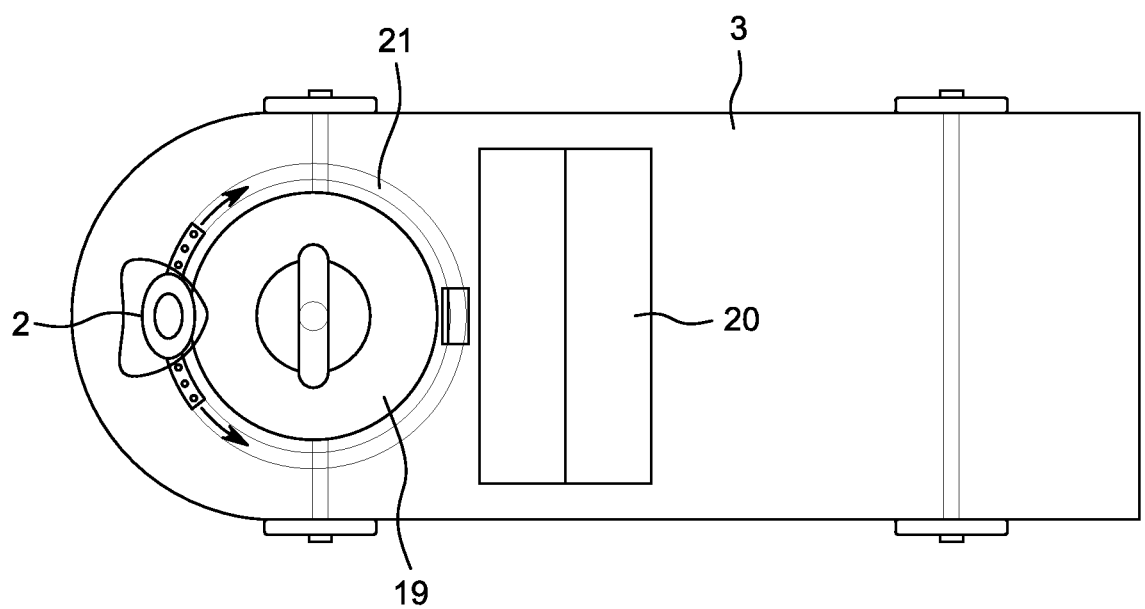
Figure 9C:
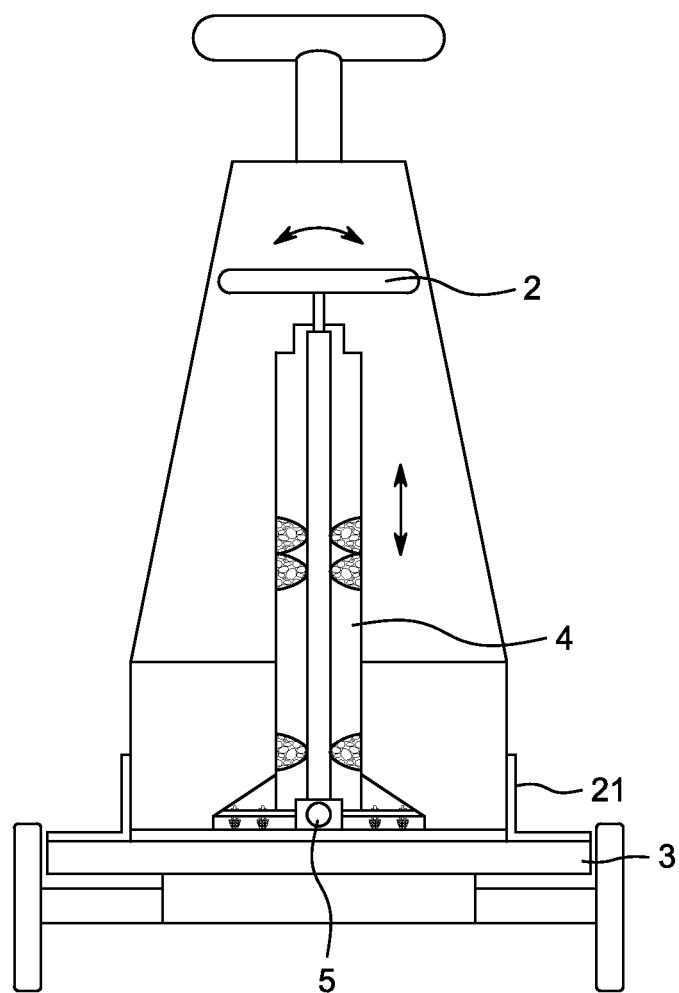

FIG. 9 shows schematically an embodiment of the invention in which the seat holder 4 and the drive unit 19 of the vehicle are mounted on a slewing ring 21. A corresponding arrangement could be used for the mounting of a standing plate. FIG. 9.a is a side view, FIG. 9.b is a top view, and FIG. 9.c is a rear or front view, dependent on the driving direction of the vehicle. The illustrated vehicle further comprises a battery 20 for supplying power to the drive unit 19. The slewing ring 21 is arranged and mounted so that it can rotate with respect to the frame 3, which frame in the illustrated embodiment is a base plate of the vehicle. This rotational movement can e.g. be obtained by having a plurality of bearings or balls or a low-friction material arranged between the base plate and an annular slewing ring, which slewing ring is circumferentially arranged around a lower end of the drive unit 19.

In an alternative embodiment (not shown), the rotational movement of the drive unit 19 and the seat holder 4 relative to the frame 3 is obtained by arranging the drive unit 19 and the seat holder 4 on a plate which is rotationally mounted on the frame 3.

By having this rotational mounting, it is obtained that the driving direction of the vehicle can be changed to match a desired manner of driving the vehicle. Such a change of direction by rotating the slewing ring 21, and thereby the seat holder 4 and the drive unit 19, may be manual or it may be driven e.g. by a motor or hydraulic system. The relative rotational movement should preferably be locked during driving.

Such a rotational adjustability can be used in combination with any of the embodiments of the invention as described above and below.

Figure 10:
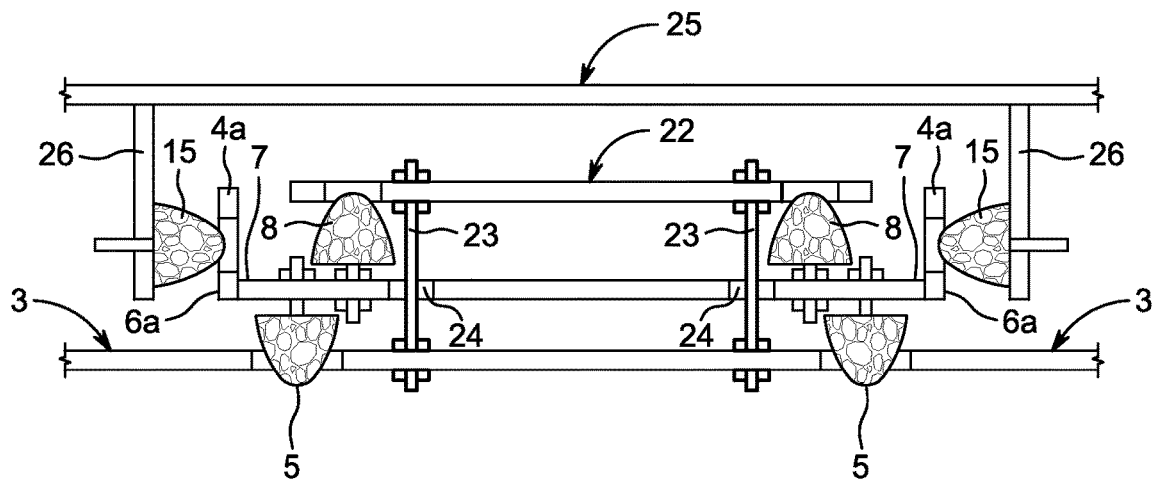
FIG. 10 shows schematically an embodiment of the invention which is designed for carrying a driver standing on a standing plate.

FIG. 10 shows schematically an embodiment of the invention which is designed for carrying a driver standing on a standing plate 25 instead of sitting on a seat as is intended with the embodiments described in the above figures. This embodiment of FIG. 10 comprises a standing plate holder 4a which resembles the seat holder 4 in the above embodiments with respect to its functioning. The standing plate holder 4a comprises a laterally extending flange 7. In the illustrated embodiment, the standing plate holder 4a is in the form of an annular ring, and the flange 7 is in the form of a plate extending across the inner space surrounded by the annular ring. The embodiment in FIG. 10 further comprises an intermediate plate 22 which is mounted to the frame 3 via connection rods 23 fastened e.g. by nuts screwed onto threaded parts of the connection rods. Hereby the distance between the frame 3 and the intermediate plate 22 is adjustable. As described above, the position of the individual vibration dampers may also be adjustable, e.g. by having them mounted via threaded rods and nuts.

The intermediate plate 22 would typically be circular and there would typically be a plurality of vertically extending connection rods 23 symmetrically arranged at a distance from a centre of the intermediate plate 22. However, other ways of establishing the connection between the frame 3 and the intermediate plate 22 are also covered by the scope of the invention provided that the same functioning is ensured.

In the illustrated embodiment in FIG. 10, the connection rods 23 extend through matching holes 24 in the flange 7. The standing plate holder 4a is arranged with respect to the frame 3 by resting on at least two tapered blocks with rounded tips which in the illustrated embodiments are identical to the vibration dampers shown in the above embodiments. Other shapes fulfilling the desired function are also covered by the scope of protection. However, since they are the only physical contact between the frame and the flange 7 of the standing plate holder 4a, two of such tapered blocks form what corresponds to a pivotal mounting around which there is free movement. When a plurality of such tapered blocks are arranged at a distance from a central vertical axis, each pair of tapered blocks can be considered as such a pivotal mounting, and the remaining ones form first dampers 8 for the free movement around the respective pivotal axis. The tapered blocks may all be arranged at the same distance from a central vertical axis, or they may be arranged at different distances.

Figure 11:
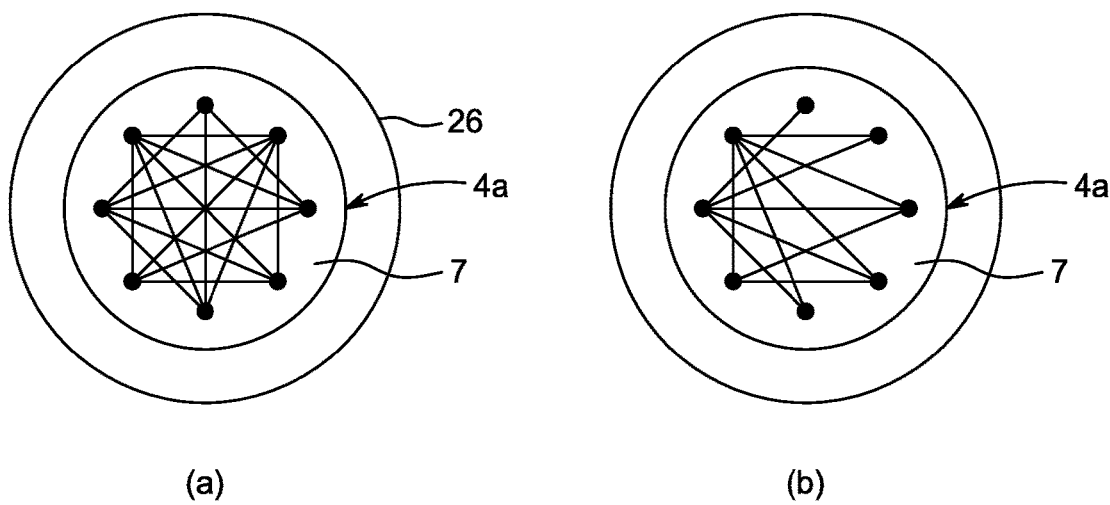
FIGS. 11.a and 11.b shows schematically top views of two examples of possible pivotal axes each formed by a pair of two tapered blocks.

FIGS. 11.a and 11.b show schematically top views of two examples of possible pivotal axes each formed by a pair of two tapered blocks. Each point represents a location of a tapered block, and each line represents a pivotal axis established by the respective pair of tapered blocks.

In the embodiment in FIG. 10, the flange is provided with upwardly facing first dampers 8 engagable with the intermediate plate 22 in order to dampen the vibrations of the vehicle during driving.

As shown in FIG. 10, the standing plate 25 is provided with a downwardly facing annular ring 26 provided with second vibration dampers 15 along an inner surface. These second vibration dampers 15 are engagable with the standing plate holder 4a along an outer circumference thereof. Alternatively, the second dampers 15 could have been mounted on the outer circumference of the standing plate holder 4a and pointing towards an inner surface of the annular ring 26 of the standing plate 25. Thus, the relationship between the annular ring 26 connected to the standing plate 25 and the standing plate holder 4a and the functioning thereof resembles what has been described above in relation to FIG. 7a illustrating a seat holder in the form of a seat rod 12 arranged inside a tubular shaft 13.

Figure 12:
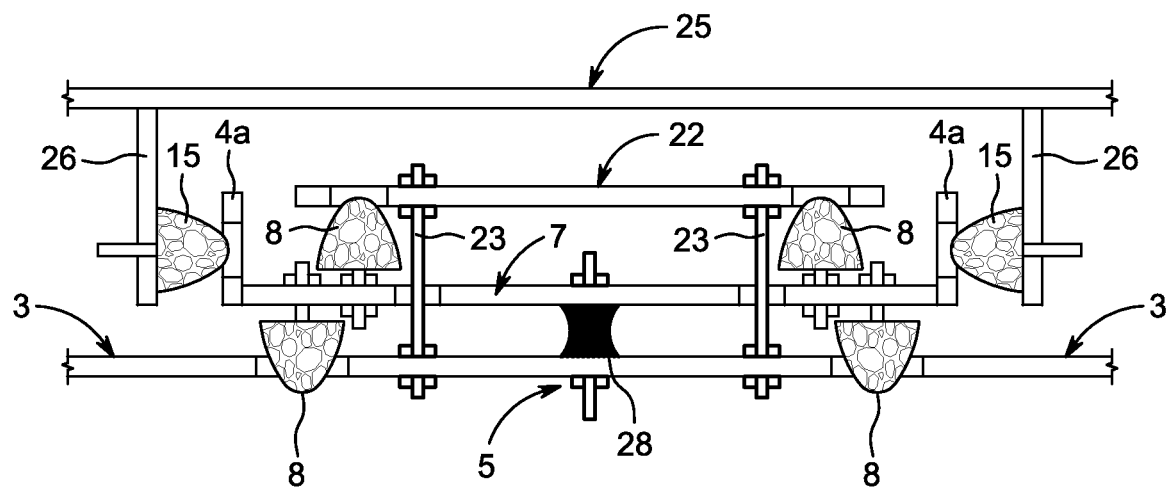
FIG. 12 shows schematically another embodiment comprising a standing plate.

FIG. 12 shows schematically another embodiment comprising a standing plate 25. This embodiment differs from the one in FIG. 10 by comprising a pivotal joint 5 between the flange 7 and the frame 3. The illustrated pivotal joint 5 comprises a block of dampening material 28. In this embodiment of the invention, all of the tapered blocks with rounded tips which formed the pivotal joint in FIG. 10 here are first dampers 8, since the pivotal joint is now a separate element. The rest of this embodiment and the functioning thereof resembles what has been described for FIG. 10.

In FIGS. 10 and 12, the standing plate 25 is shown as being provided with an annular ring 26 carrying the second vibration dampers 15. However, as explained above, an alternative to such an annular ring would be to use a plurality of downwardly facing circumferentially arranged tabs 26a.

In FIGS. 10 and 12, the first and second vibration dampers 8,15 are illustrated as extending through matching holes in the elements with which they are engageable. By "matching holes" is meant that the holes are adapted to engage with the respective vibration dampers in a predetermined manner. Such holes for engagement could in the same way be incorporated in the embodiments shown in the previous figures. Hereby the adjustability of the damping characteristic is increased compared to embodiments without such holes. This makes it possible to optimize the damping characteristic of a device in accordance with a desired performance of the device for given use. The damping characteristic may be optimized by varying one or more of the following design parameters for the holes: the three-dimensional shape, the size, the position, and the number. By "three-dimensional shape" is meant that the plate or ring in which the hole is made has a thickness and that the shape and dimension of a hole may vary through the thickness of the plate. The shape does not need to be rotationally symmetrical. A hole may e.g. be elliptical to provide for different damping characteristics in two perpendicular directions. By "the position" is meant in any direction, such as vertically or radially. Furthermore, the damping characteristic will also depend on the material of the vibration dampers as well as of the plate or ring in which the hole is made. In addition, the damping characteristic will also depend on the positions of the vibrations dampers, these positions being adjustable as described above. By possible variations of all these parameters, it is possible to optimize the device for a given use and to change the settings when the device is to be used for another application.

Figure 13:
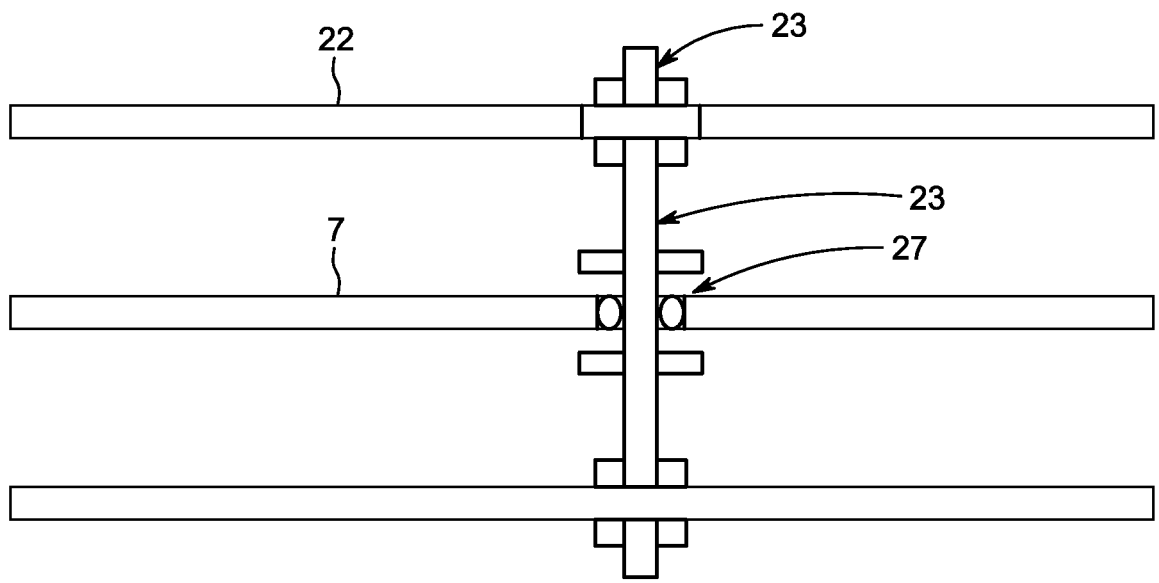
FIG. 13 shows schematically a partial view of a region around a bearingly mounted connection rod of an embodiment resembling any of those in FIGS. 10 and 12.

FIG. 13 shows schematically a partial view of a region around a bearingly mounted connection rod 23 of an embodiment resembling any of those in FIGS. 10 and 12. It is mounted by use of spherical bearing 27 which allows for the pivotal movement. The spherical bearing 27 may be able to slide along the connection rod 23, or it may be fixed to a predetermined position.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A device (1) for mounting a seat (2) relative to a frame (3) of a vehicle, the device (1) comprising a seat holder (4) adapted to carry the seat (2), and the seat holder (4) having an outer surface (6), wherein:
   the seat holder (4) is provided with at least one flange (7) extending laterally from the seat holder (4),
   the seat holder (4) is pivotally mounted to the frame (3) so that the frame (3) and the seat holder (4) can move relative to each other laterally in at least one plane, when the device (1) is in use mounted on the vehicle,
   at least one first vibration damper (8) and/or at least one stop (10) being arranged to limit the possible movement of the at least one flange (7) thereby providing free movement until limits for the pivotal movement of the frame (3) relative to the seat holder (4) are met, and
   the positions of the at least one first vibration damper (8) and/or the at least one stop (10) relative to the at least one flange (7) are adjustable so that the limits for the possible movement of the at least one flange (7) and thereby the possible movement of the frame (3) relative to the seat holder (4) are adjustable.

2. A device (1) for mounting a standing plate (25) relative to a frame (3) of a vehicle, the device (1) comprising the standing plate (25) and a standing plate holder (4a) adapted to carry the standing plate (25), and the standing plate holder (4a) having an engagement surface (6a), wherein:
   the standing plate holder (4a) is provided with at least one flange (7) extending laterally from the standing plate holder (4a),
   the standing plate holder (4a) is pivotally mounted to the frame (3) so that the frame (3) and the standing plate holder (4a) can move relative to each other laterally in at least one plane, when the device (1) is in use mounted on the vehicle,
   at least one first vibration damper (8) and/or at least one stop (10) being arranged to limit the possible movement of the at least one flange (7) thereby providing free movement until limits for the pivotal movement of the frame (3) relative to the standing plate holder (4a) are met, and
   the positions of the at least one first vibration damper (8) and/or the at least one stop (10) relative to the at least one flange (7) are adjustable so that the limits for the possible movement of the at least one flange (7) and thereby the possible movement of the frame (3) relative to the standing plate holder (4a) are adjustable.

3. The device (1) according to claim 1, wherein the seat holder (4) is pivotally mounted in two separate hinges (5) having non-parallel axes of rotation.

4. The device (1) according to claim 3, wherein the seat holder (4) is mounted to the frame (3) via a cardan joint so that the seat holder (4) is rotatable 360 degrees around a central point of the cardan joint.

5. The device (1) according to claim 1, wherein the pivotal mounting of the seat holder (4) in relation to the frame (3) is the only mounting thereof.

6. The device (1) according to claim 1, wherein the seat holder (4) comprises:
   a seat rod (12) adapted to carry the seat (2), and
   a tubular shaft (13) having a circumferential wall, the tubular shaft (13) having the seat rod (12) retained within the circumferential wall.

7. The device (1) according to claim 6, wherein an inner surface (14) of the circumferential wall of the tubular shaft (13) is provided with at least one set of circumferentially arranged second vibration dampers (15), the second vibration dampers (15) extending to the seat rod (12) so that the seat rod (12) is supported by the second vibration dampers (15).

8. The device (1) according to claim 7, wherein the inner surface (14) is provided with at least two sets of circumferentially arranged second vibration dampers (15) which sets are spaced apart along the tubular shaft (13).

9. The device Device (1) according to claim 2, wherein the standing plate (25) is provided with a downwardly facing annular ring (26) or a plurality of downwardly facing circumferentially arranged tabs (26a), and wherein an inner surface (14a) of the annular ring (26) or inner surfaces (14b) of the tabs (26a) is/are provided with at least one set of circumferentially arranged second vibration dampers (15), the second vibration dampers (15) extending to the standing plate holder (4a) so that the standing plate (25) is supported by the second vibration dampers (15).

10. The device (1) according to claim 1, wherein each of the at least one first vibration damper (8) is made from of a resilient material and is in the form of a tapered block with rounded tip (16), the rounded tip (16) facing towards the at least one flange (7).

11. The device (1) according to claim 7, wherein the second vibration dampers (15) are made from of a resilient material and are in the form of tapered blocks with rounded tips (16), the rounded tips (16) facing towards the seat rod (12) or towards the standing plate holder (4a).

12. The device according to claim 7, wherein the first vibration dampers (8) and/or second vibration dampers (15) are provided with threading, and wherein the position of those vibration dampers (8, 15) are adjustable by screwing the threading relative to a threaded counterpart.

13. The device (1) according to claim 6, wherein a lower end of the seat rod (12) is arranged on a third vibration damper (18) adapted to dampen the movements of the seat rod (12) when in use on a moving vehicle.

14. The device (1) according to claim 1, wherein the seat holder (4) and a drive unit (19) of the vehicle may be mounted on a slewing ring (21) which is arranged and mounted so that it can rotate with respect to the frame (3).

15. A vehicle, comprising a device (1) according to claim 1 and-a seat (2) mounted to the vehicle by use of the device (1).

16. The device (1) according to claim 2, wherein the standing plate holder (4a) is pivotally mounted in two separate hinges (5) having non-parallel axes of rotation.

17. The device (1) according to claim 16, wherein the standing plate holder (4a) is mounted to the frame (3) via a cardan joint so that the standing plate holder (4a) is rotatable 360 degrees around a central point of the cardan joint.

18. The device (1) according to claim 2, wherein the pivotal mounting of the standing plate holder (4a) in relation to the frame (3) is the only mounting thereof.

19. The device (1) according to claim 2, wherein the standing plate holder (4a) and a drive unit (19) of the vehicle may be mounted on a slewing ring (21) which is arranged and mounted so that it can rotate with respect to the frame (3).

* * * * *